(12) United States Patent
Kok-Hiong et al.

(10) Patent No.: US 7,628,170 B2
(45) Date of Patent: Dec. 8, 2009

(54) FLOW CONTROL VALVE

(75) Inventors: Kee Kok-Hiong, St. Louis, MO (US); Girish Mevada, Maharashtra (IN)

(73) Assignee: Emerson Electric Co., St. Louis, MO (US)

( * ) Notice: Subject to any disclaimer, the term of this patent is extended or adjusted under 35 U.S.C. 154(b) by 289 days.

(21) Appl. No.: 11/850,329

(22) Filed: Sep. 5, 2007

(65) Prior Publication Data

US 2009/0057590 A1  Mar. 5, 2009

(51) Int. Cl.
*F16K 15/18* (2006.01)
(52) U.S. Cl. .............. 137/601.2; 137/601.14; 137/601.18; 251/205; 251/208
(58) Field of Classification Search ........ 137/102, 137/110, 601.18, 601.14, 601.2; 251/205, 251/208
See application file for complete search history.

(56) References Cited

U.S. PATENT DOCUMENTS

| | | | |
|---|---|---|---|
| 1,751,591 A | 3/1930 | McCloskey | |
| 2,911,008 A * | 11/1959 | Du Bois | 137/625.31 |
| 3,987,819 A | 10/1976 | Scheuermann | 137/637.3 |
| 4,327,758 A | 5/1982 | Uhlmann | 137/625.17 |
| 4,380,250 A * | 4/1983 | Stoll | 137/556 |
| 4,431,161 A * | 2/1984 | Miller et al. | 251/129.11 |
| 4,673,160 A * | 6/1987 | Tolley | 251/129.05 |
| 6,619,613 B1 | 9/2003 | Akamatsu et al. | 251/129.04 |
| 7,093,818 B2 | 8/2006 | Koeneman | 251/208 |
| 7,168,677 B2 | 1/2007 | Gama et al. | 251/69 |
| 7,316,384 B2 | 1/2008 | Sekiya et al. | 251/129.11 |
| 2003/0010950 A1* | 1/2003 | Schiavone et al. | 251/129.11 |

* cited by examiner

*Primary Examiner*—John Rivell
*Assistant Examiner*—Jeremy S Baskin
(74) *Attorney, Agent, or Firm*—Harness, Dickey & Pierce, P.L.C.

(57) ABSTRACT

A flow control valve is provided that comprises a valve housing having an inlet, an outlet, and a valve chamber that includes a first valve port opening in communication with the inlet and a second valve port opening in communication with the outlet. The various embodiments further comprise a modulating member having first and second tapered arcuate slots therein, which is disposed in the valve chamber approximate the first valve port opening and second valve port opening. The modulating member is rotatable to adjustably position a wider or narrower portion of both the first tapered arcuate slot and second tapered arcuate slot over the first valve port opening and second valve port opening respectively, to adjustably vary the rate of fluid flow through the valve.

10 Claims, 13 Drawing Sheets

FLOW CONTROL VALVE

FIELD OF THE INVENTION

The present disclosure relates to flow control valves, and more particularly to motor actuated modulating flow control valves.

BACKGROUND

The statements in this section merely provide background information related to the present disclosure and may not constitute prior art.

In a conventional refrigeration or HVAC system, flow control devices are typically utilized to control the flow of working fluids in a refrigeration system. In general, the refrigeration system would include a compressor that forces the particular refrigerant used in the system through a condensing coil, where the refrigerant vapor liquefies. The liquid refrigerant passes through a thermostatic expansion valve, expanding the high pressure liquid refrigerant to a low pressure vapor. The low pressure, low temperature refrigerant discharged from the thermostatic expansion valve is then directed through an evaporator coil for absorbing heat and thus refrigerating the space inside the container surrounding the evaporator coil.

The thermostatic expansion valve meters the flow of refrigerant into the evaporator coil in proportion to the rate of evaporation of the refrigerant in the evaporator coil, and is responsive to the temperature and pressure of the refrigerant leaving the evaporator coil. In this manner, the thermostatic expansion valve can control the refrigerant leaving the evaporator coil at a predetermined superheat. Generally, the superheat of the refrigerant is a measure of the heat contained in the refrigerant vapor above its heat content at the boiling point (saturated vapor temperature) at the existing pressure. Maintaining the refrigerant entering the suction line from the evaporator coil at a desired superheat level enhances the refrigeration system performance.

Thermal expansion valves are typically used, in conjunction with a suction regulator, to maintain a consistent evaporator coil pressure. In known systems, conventionally designed mechanical pressure regulators are used for this purpose. Conventional mechanical pressure regulators include a throttling element that, when moved, limits the flow of the refrigerant through the suction regulator to regulate the pressure. A diaphragm, or other sensing element, responds to variations in the inlet pressure and moves the throttling element accordingly. A reference pressure, typically exerted by a spring, is applied to one side of the diaphragm to bias the diaphragm in a desired position, or set point. High side inlet pressure is applied to the other side of the diaphragm to move the diaphragm against the spring, and thus, move the throttling element.

In many refrigeration system implementations, finer temperature control is desirable. Adjusting the setting of conventionally designed mechanical pressure regulators in such thermal expansion valves can be a time consuming, manual process. Moreover, if the refrigerant or desired temperature changes, the complicated process of manually adjusting the pressure regulator's set screw must be repeated.

SUMMARY

The present disclosure relates to various embodiments of a variable flow control valve including a slotted modulating component that reciprocally rotates slotted portions of the modulating component relative to first and second valve openings. In the various embodiments, a flow control valve is provided that comprises a valve housing having an inlet, an outlet, and a valve chamber that includes a first valve port opening in communication with the inlet and a second valve port opening in communication with the outlet. The various embodiments further comprise a modulating member having first and second tapered arcuate slots therein, which is disposed in the valve chamber approximate the first valve port opening and second valve port opening. The modulating member is rotatable to position a portion of the first tapered arcuate slot over the first valve port opening and a portion of the second tapered arcuate slot over the second valve port opening. In the various embodiments, rotation of the modulating member adjustably positions a wider or narrower portion of both the first tapered arcuate slot and second tapered arcuate slot over the first valve port opening and second valve port opening respectively, to adjustably vary the rate of fluid flow through the valve. The various embodiments of a flow control valve further comprise a motor coupled to the modulating member for adjustably rotating the modulating member to controllably adjust the rate of fluid flow through the valve.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
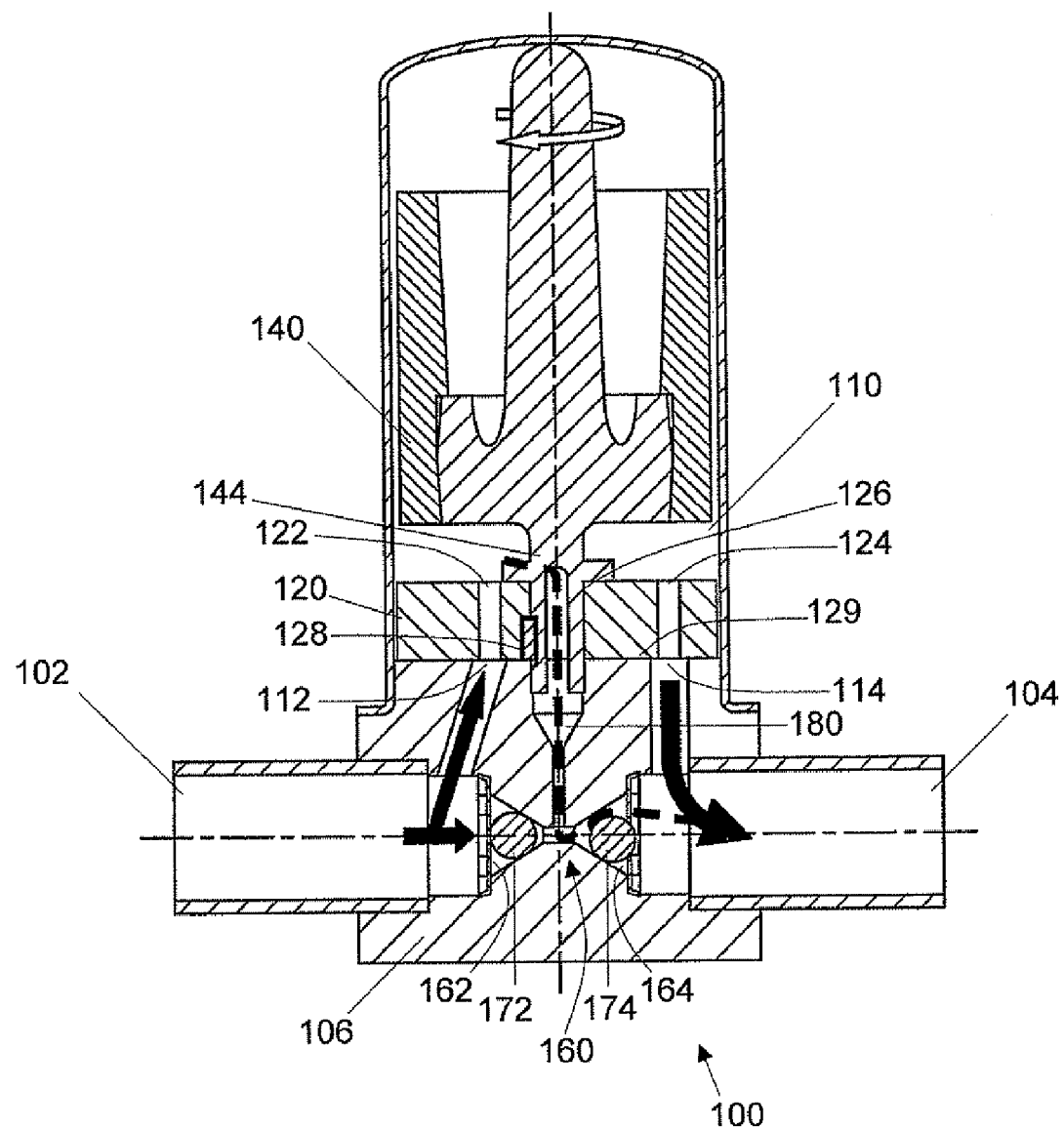
FIG. 1 is a cross-sectional view of a first embodiment of a solenoid valve shown in an open position, in accordance with the principles of the present disclosure.

The following description is merely exemplary in nature and is not intended to limit the present disclosure, application, or uses. It should be understood that throughout the drawings, corresponding reference numerals indicate like or corresponding parts and features.

According to various aspects of the present disclosure, there are provided various exemplary embodiments of a flow control valve. In the various embodiments, a flow control valve is provided that comprises a valve housing having an inlet, an outlet, and a valve chamber that includes a first valve port opening in communication with the inlet and a second valve port opening in communication with the outlet. The various embodiments further comprise a modulating member having first and second tapered arcuate slots therein, which is disposed in the valve chamber approximate the first valve port opening and second valve port opening. The modulating member is rotatable to position a portion of the first tapered arcuate slot over the first valve port opening and a portion of the second tapered arcuate slot over the second valve port opening. In the various embodiments, rotation of the modulating member adjustably positions a wider or narrower portion of both the first tapered arcuate slot and second tapered arcuate slot over the first valve port opening and second valve port opening respectively, to adjustably vary the rate of fluid flow through the valve. The various embodiments of a flow control valve further comprise a motor coupled to the modulating member for adjustably rotating the modulating member to controllably adjust the rate of fluid flow through the valve.

Referring to FIG. 1, a first embodiment of a flow control valve is shown generally at 100. The flow control valve 100 comprises a valve housing 106 having an inlet 102 and an outlet 104. The valve further includes a valve chamber 110. The valve chamber 110 has a first valve port opening 112 in communication with the inlet 102, and a second valve port opening 114 in communication with the outlet 104. A modulating member 120 is disposed in the chamber 110 approximate the first valve port opening 112 and second valve port opening 114. The modulating member 120 preferably has a first tapered arcuate slot 122 and second tapered arcuate slot 124 encircling a central aperture 126. The modulating member 120 is configured, by virtue of a keyed configuration of the central aperture 126, to rotate about the central aperture 126 to position a portion of the first tapered arcuate slot 122 over the first valve port opening 112, and to position a portion of the second tapered arcuate slot 124 over the second valve port opening 114. Rotation of the modulating member 120 adjustably positions a wider or narrower portion of both the first tapered arcuate slot 122 and second tapered arcuate slot 124 over the first valve port opening 112 and second valve port opening 114 respectively, to adjustably vary the rate of fluid flow through the valve 100. The flow control valve further includes a motor 140 coupled to the modulating member 120 via the central aperture 126, for adjustably rotating the modulating member 120 to controllably adjust the rate of fluid flow through the valve port openings to the outlet 104.

Figure 9:
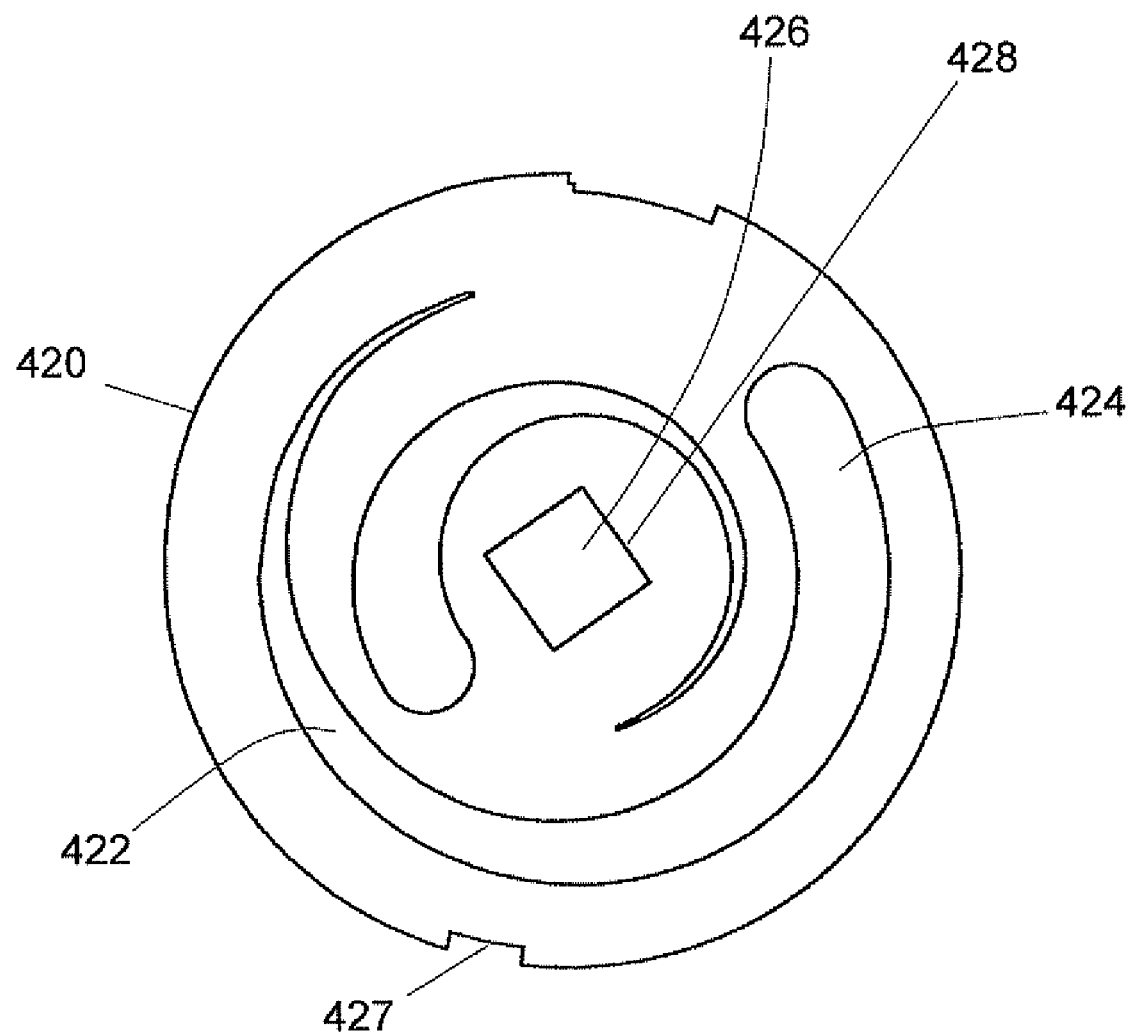
FIG. 9 is a top plane view of one embodiment of a modulating member according to the principles of the present invention.

The modulating member 120 in the first embodiment preferably comprises a plate having a generally round contour or periphery, and a central aperture 126 having a keyed configuration or surface 128 with which the modulating member may be rotated by a drive shaft component. The modulating member 120 further comprises a first inner arcuate slot 122 that is comet-shaped or semi-circular in contour, and generally partially encircles or surrounds the central aperture 126 in a concentric manner (as shown in FIG. 9, for example). The modulating member 120 further comprise a second outer arcuate slot 124 that is also comet-shaped or semi-circular in contour, and generally partially encircles or surrounds the central aperture 126 in a concentric manner. The first and second semi-circular slots 122, 124 are generally disposed on generally opposing sides of the modulating member 120, to correspond with the first and second valve port openings 112 and 114 that are also on generally opposed sides of the valve chamber 110. It should be noted that the first inner arcuate slot 122 and second outer arcuate slot 124 may be positioned on the same side of the modulating member 120, where the first and second valve port openings 112, 114 are on the same side of the valve chamber 110. Likewise, the modulating member 120 may have a first inner arcuate slot 122 and second outer arcuate slot 124 in any arrangement that corresponds to the orientation of the first and second valve port openings 112, 114 within the valve chamber 110.

The first and second semi-circular slots 122, 124 are generally aligned or positioned to correspond with the first and second valve port openings 112 and 114, such that rotation of the modulating member 120 adjustably positions a wider or narrower portion of both the first tapered arcuate slot 122 and second tapered arcuate slot 124 over the first valve port opening 112 and second valve port opening 114 respectively, to adjustably vary the rate of fluid flow through the valve 100. The modulating member is further configured to be rotated to a substantially closed position, in which the first and second valve port openings 112, 114 are substantially closed off by the surface 129 of the modulating member 120, to restrict fluid flow through the valve port openings 112, 114.

The first embodiment of a flow control valve 100 further includes a stepper motor, or indexing motor, which includes a drive shaft 144 that is configured to be coupled to the central aperture 126 of the modulating member 120. The stepper motor 140 is capable of adjustably rotating the modulating member 120, to controllably adjust the rate of fluid flow through the valve port openings 112, 114 to the outlet 104. The motor 140 controllably rotates the modulating member 120 to incrementally index the modulating member 120 to a plurality of positions for incrementally adjusting the rate of fluid flow through the valve port openings 112, 114.

It should be noted that in the first embodiment, the motor shaft 144 is preferably configured to hold or maintain the position of the modulating member 120 relative to the top surface of the valve housing, so that the modulating member 120 is maintained adjacent to or approximate the valve port openings 112 and 114, to provide for effectively sealing against the openings at fluid operating pressures up to 500 psi. For example, the motor shaft 144 may include a flange against which the modulating member 120 is seated. Alternatively, the modulating member 120 may be placed onto the motor shaft 144 in a desired positioned relative to the valve housing and secured to the motor shaft 144 by a key inserted into a keyway in the motor shaft 144. Accordingly, it should be understood that various suitable means for securing the modulating member 120 relative to the motor shaft in a desired position relative to the top surface of the valve housing may be used, and are considered to be equivalents in scope.

The first embodiment of a flow control valve may optionally comprise an integral two-way check valve 160 disposed between the inlet 102 and outlet 104. The two-way check valve 160 may comprise a converging-diverging passageway 162 and 164, each end portion of which has a check ball 172 and 174 retained therein. Each check ball 172 and 174 is configured to move into engagement with the tapered passageway to block the passageway and restrict fluid flow through the passageway when exposed to a pressure differential across the inlet 102 and outlet 104 of at least 5 psi. Thus, when the fluid pressure at the inlet is greater than the fluid pressure at the outlet, the valve permits fluid flow from the inlet through the first valve port opening and first tapered arcuate slot into the valve chamber, and out through the second tapered arcuate slot and second valve port opening to the outlet. The flow rate of fluid through the valve 100 is controlled by the rotational position of the first and second tapered arcuate slots 122 and 124 relative to the first and second valve port openings 112 and 114 respectively. The valve 100 may further comprise a bleed passage 180 extending between the valve chamber 110 and the converging-diverging passageway 162/164 of the two-way check valve 160, wherein fluid is passed through the bleed passage 180 and two way check valve 160 to the low pressure side. This bleed passage allows for reducing the effect of forward and reverse flow hysteresis caused by changes in pressure levels.

Figure 2:
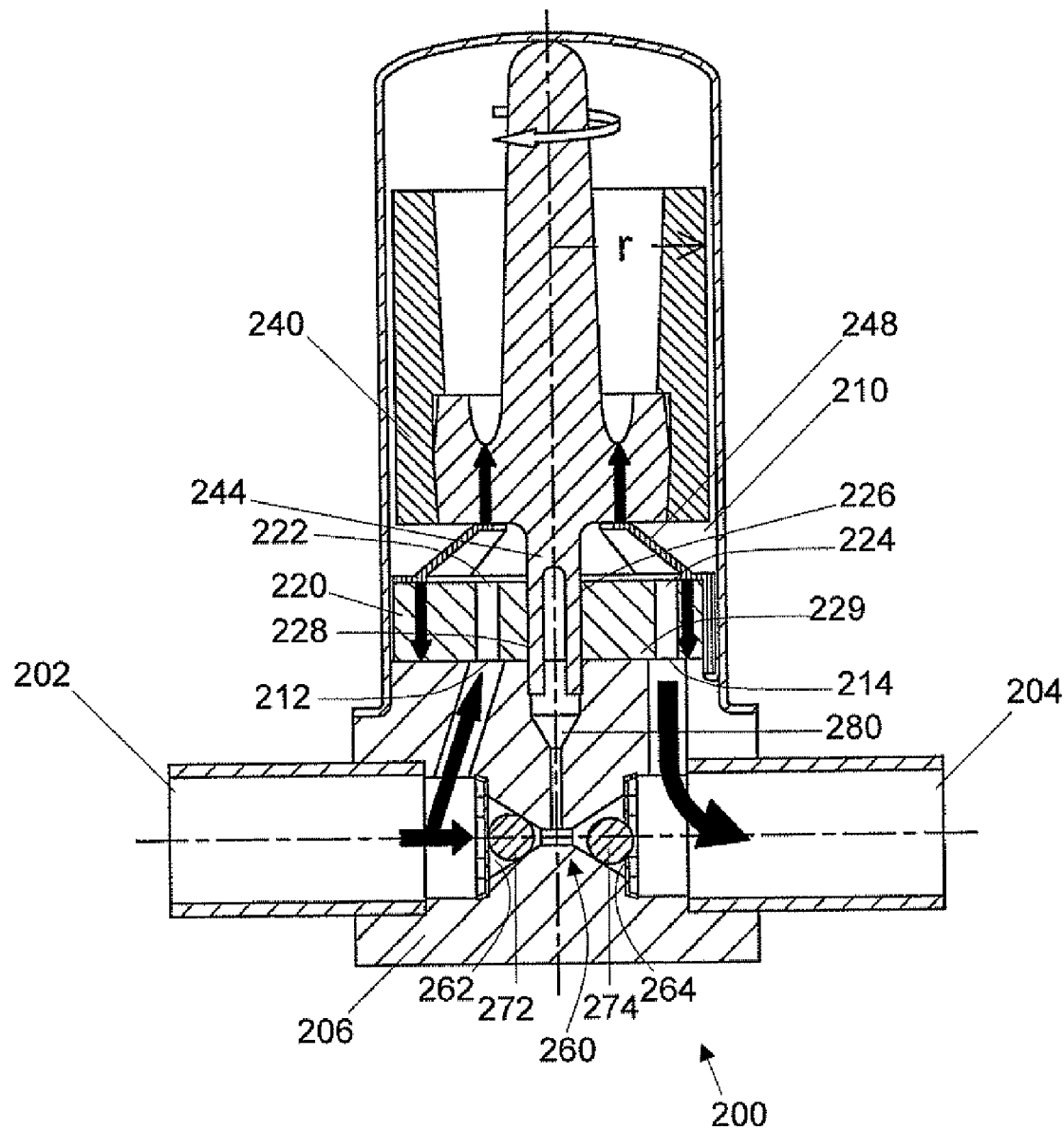
FIG. 2 is a cross-sectional view of a second embodiment of a solenoid valve shown in an open position.

Referring to FIG. 2, a second embodiment of a flow control valve is shown generally at 200. The flow control valve 200 comprises a valve housing 206 having an inlet 202 and an outlet 204. The valve 200 further includes a valve chamber 210. The valve chamber 210 has a first valve port opening 212 in communication with the inlet 202, and a second valve port opening 214 in communication with the outlet 204. A modulating member 220 is disposed in the chamber 210 approximate the first valve port opening 212 and second valve port opening 214. The modulating member 220 preferably has a first tapered arcuate slot 222 and second tapered arcuate slot 224 encircling a central aperture 226. The modulating member 220 is configured, by virtue of a keyed configuration of the central aperture 226, to rotate about the central aperture 226 to position a portion of the first tapered arcuate slot 222 over the first valve port opening 212, and to position a portion of the second tapered arcuate slot 224 over the second valve port opening 214. Rotation of the modulating member 220 adjustably positions a wider or narrower portion of both the first tapered arcuate slot 222 and second tapered arcuate slot 224 over the first valve port opening 212 and second valve port opening 214 respectively, to adjustably vary the rate of fluid flow through the valve 200. The flow control valve further includes a motor 240 coupled to the modulating member 220 via the central aperture 226, for adjustably rotating the modulating member 220 to controllably adjust the rate of fluid flow through the valve port openings to the outlet 204.

The modulating member 220 in the second embodiment preferably comprises a plate having a generally round contour or periphery, and a central aperture 226 having a keyed configuration or surface 228 with which the modulating member may be rotated by a drive shaft component. The modulating member 220 further comprises a first inner arcuate slot 222 that is comet-shaped or semi-circular in contour, and generally partially encircles or surrounds the central aperture 226 in a concentric manner (as shown in FIG. 9, for example). The modulating member 220 further comprises a second outer arcuate slot 224 that is also comet-shaped or semi-circular in contour, and generally partially encircles or surrounds the central aperture 226 in a concentric manner. The first and second semi-circular slots 222, 224 are generally disposed on generally opposing sides of the modulating member 220, to correspond with the first and second valve port openings 212 and 214 that are also on generally opposed sides of the valve chamber 210. It should be noted that the first inner arcuate slot 222 and second outer arcuate slot 224 may be positioned on the same side of the modulating member 220, where the first and second valve port openings 212, 214 are on the same side of the valve chamber 210. Likewise, the modulating member 220 may have a first inner arcuate slot 222 and second outer arcuate slot 224 in any arrangement that corresponds to the orientation of the first and second valve port openings 212, 214 within the valve chamber 210.

The first and second semi-circular slots 222, 224 are generally aligned or positioned to correspond with the first and second valve port openings 212 and 214, such that rotation of the modulating member 220 adjustably positions a wider or narrower portion of both the first tapered arcuate slot 222 and second tapered arcuate slot 224 over the first valve port opening 212 and second valve port opening 214 respectively, to adjustably vary the rate of fluid flow through the valve 200. The modulating member is further configured to be rotated to a substantially closed position, in which the first and second valve port openings 212, 214 are substantially closed off by the surface 229 of the modulating member 220, to restrict fluid flow through the valve port openings 212, 214.

The second embodiment of a flow control valve 200 further includes a stepper motor, or indexing motor, which includes a drive shaft 244 that is configured to be coupled to the central aperture 226 of the modulating member 220. The stepper motor 240 is capable of adjustably rotating the modulating member 220, to controllably adjust the rate of fluid flow through the valve port openings 212, 214 to the outlet 204. The motor 240 controllably rotates the modulating member 220 to incrementally index the modulating member 220 to a plurality of positions for incrementally adjusting the rate of fluid flow through the valve port openings 212, 214.

The second embodiment of a flow control valve 200 further includes a biasing spring 248, which is configured to bias the modulating member against the first and second valve port openings 212 and 214. The biasing spring 248 is preferably configured to hold or maintain the position of the modulating member 220 adjacent to or approximate the valve port openings 212 and 214, to provide for effectively sealing against the openings at fluid operating pressures up to 500 psi.

In the second embodiment of a flow control valve, the valve may optionally comprise an integral two-way check valve 260 disposed between the inlet 202 and outlet 204, as shown in FIG. 2. It should be understood, however, that this check valve feature may be omitted from the flow control valve. The two-way check valve 260 may comprise a converging-diverging passageway 262 and 264, each end portion of which has a check ball 272 and 274 retained therein. Each check ball 272 and 274 is configured to move into engagement with the tapered passageway to block the passageway and restrict fluid flow through the passageway when exposed to a pressure differential across the inlet 202 and outlet 204 of at least 5 psi. Thus, when the fluid pressure at the inlet is greater than the fluid pressure at the outlet, the valve permits fluid flow from the inlet through the first valve port opening and first tapered arcuate slot into the valve chamber, and out through the second tapered arcuate slot and second valve port opening to the outlet. The flow rate of fluid through the valve 200 is controlled by the rotational position of the first and second tapered arcuate slots 222 and 224 relative to the first and second valve port openings 212 and 214 respectively. The valve 200 may further comprise a bleed passage 280 extending between the valve chamber 210 and the converging-diverging passageway 262/264 of the two-way check valve 260, wherein fluid is passed through the bleed passage 280 and two way check valve 260 to the low pressure side. This bleed passage allows for reducing the effect of forward and reverse flow hysteresis caused by changes in pressure levels.

Figure 3:
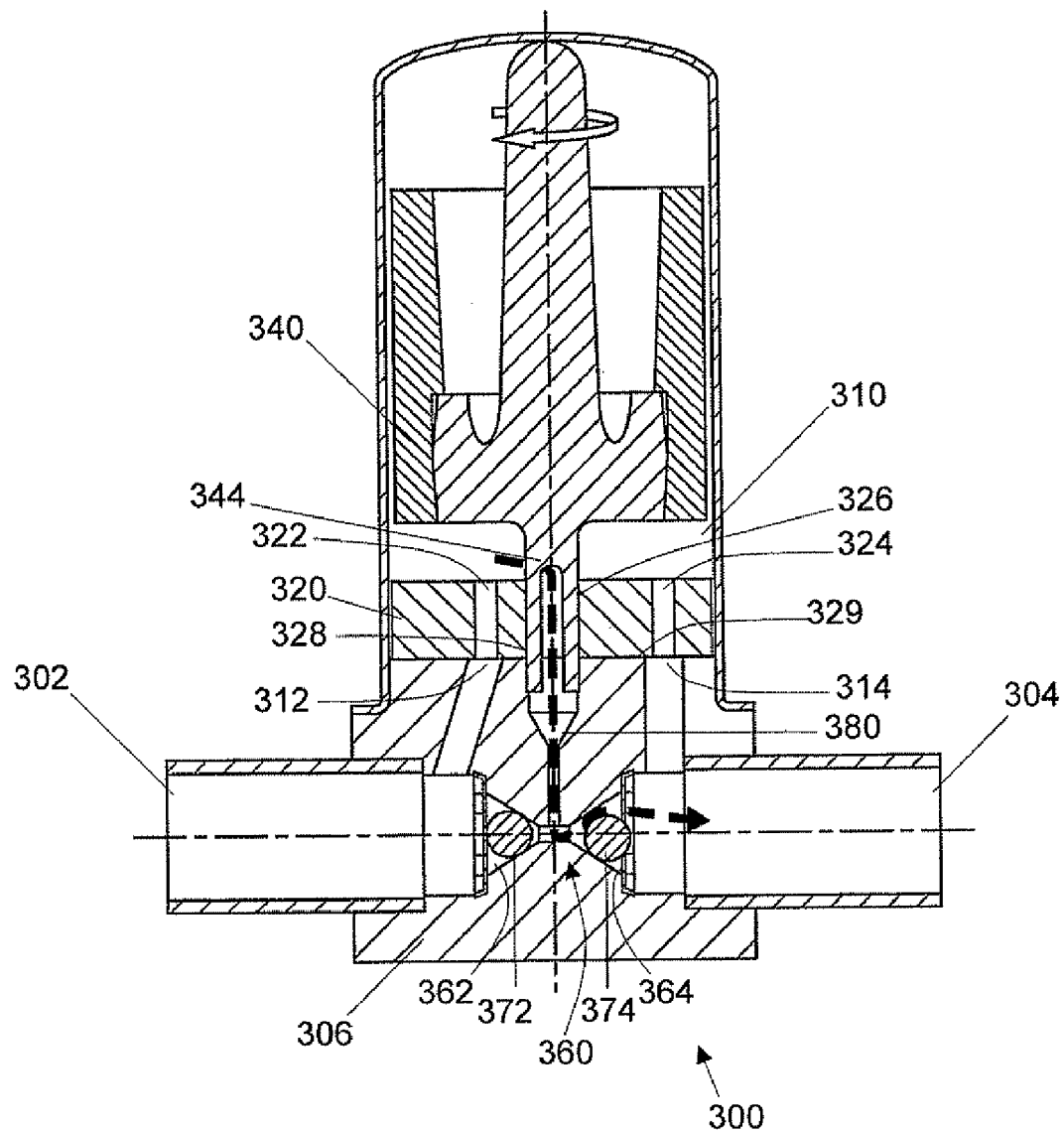
FIG. 3 is a cross-sectional view of a third embodiment of a solenoid valve shown in an open position.

Referring to FIG. 3, a third embodiment of a flow control valve is shown generally at 300. The flow control valve 300 comprises a valve housing 306 having an inlet 302 and an outlet 304. The valve 300 further includes a valve chamber 310. The valve chamber 310 has a first valve port opening 312 in communication with the inlet 302, and a second valve port opening 314 in communication with the outlet 304. A modulating member 320 is disposed in the chamber 310 approximate the first valve port opening 312 and second valve port opening 314. The modulating member 320 preferably has a first tapered arcuate slot 322 and second tapered arcuate slot 324 encircling a central aperture 326. The modulating member 320 is configured, by virtue of a keyed configuration of the central aperture 326, to rotate about the central aperture 326 to position a portion of the first tapered arcuate slot 322 over the first valve port opening 312, and to position a portion of the second tapered arcuate slot 324 over the second valve port opening 314. Rotation of the modulating member 320 adjustably positions a wider or narrower portion of both the first tapered arcuate slot 322 and second tapered arcuate slot 324 over the first valve port opening 312 and second valve port opening 314 respectively, to adjustably vary the rate of fluid flow through the valve 300. The flow control valve further includes a motor 340 coupled to the modulating member 320 via the central aperture 326, for adjustably rotating the modulating member 320 to controllably adjust the rate of fluid flow through the valve port openings to the outlet 304.

The modulating member 320 in the third embodiment preferably comprises a plate having a generally round contour or periphery, and a central aperture 326 having a keyed configuration or surface 328 with which the modulating member may be rotated by a drive shaft component. The modulating member 320 further comprises a first inner arcuate slot 322 that is comet-shaped or semi-circular in contour, and generally partially encircles or surrounds the central aperture 326 in a concentric manner (as shown in FIG. 9, for example). The modulating member 320 further comprises a second outer arcuate slot 324 that is also comet-shaped or semi-circular in contour, and generally partially encircles or surrounds the central aperture 326 in a concentric manner. The first and second semi-circular slots 322, 324 are generally disposed on generally opposing sides of the modulating member 320, to correspond with the first and second valve port openings 312 and 314 that are also on generally opposed sides of the valve chamber 310. It should be noted that the first inner arcuate slot 322 and second outer arcuate slot 324 may be positioned on the same side of the modulating member 320, where the first and second valve port openings 312, 314 are on the same side of the valve chamber 310. Likewise, the modulating member 320 may have a first inner arcuate slot 322 and second outer arcuate slot 324 in any arrangement that corresponds to the orientation of the first and second valve port openings 312, 314 within the valve chamber 310.

The first and second semi-circular slots 322, 324 are generally aligned or positioned to correspond with the first and second valve port openings 312 and 314, such that rotation of the modulating member 320 adjustably positions a wider or narrower portion of both the first tapered arcuate slot 322 and second tapered arcuate slot 324 over the first valve port opening 312 and second valve port opening 314 respectively, to adjustably vary the rate of fluid flow through the valve 300. The modulating member is further configured to be rotated to a substantially closed position, in which the first and second valve port openings 312, 314 are substantially closed off by the surface 329 of the modulating member 320, to restrict fluid flow through the valve port openings 312, 314.

The third embodiment of a flow control valve 300 further includes a stepper motor, or indexing motor, which includes a drive shaft 344 that is configured to be coupled to the central aperture 326 of the modulating member 320. The stepper motor 340 is capable of adjustably rotating the modulating member 320, to controllably adjust the rate of fluid flow through the valve port openings 312, 314 to the outlet 304. The motor 340 controllably rotates the modulating member 320 to incrementally index the modulating member 320 to a plurality of positions for incrementally adjusting the rate of fluid flow through the valve port openings 312, 314.

In the third embodiment of a flow control valve, the valve may optionally comprise a biasing spring (not shown), which is configured to bias the modulating member against the first and second valve port openings 312 and 314. It should be understood, however, that this biasing spring feature may be omitted from the flow control valve. For example, the flow control valve 300 may comprise a motor shaft 344 that is preferably configured to hold or maintain the position of the modulating member 320 relative to the top surface of the valve housing. Accordingly, various features may be utilized to maintain the modulating member 320 adjacent to or approximate the valve port openings 312 and 314, to provide for effectively sealing against the openings at fluid operating pressures up to 500 psi.

In the third embodiment of a flow control valve, the valve further comprises an integral two-way check valve 360 disposed between the inlet 302 and outlet 304, as shown in FIG. 3. It should be understood, however, that this check valve feature may be omitted from the flow control valve. The two-way check valve 360 may comprise a converging-diverging passageway 362 and 364, each end portion of which has a check ball 372 and 374 retained therein. Each check ball 372 and 374 is configured to move into engagement with the tapered passageway to block the passageway and restrict fluid flow through the passageway when exposed to a pressure differential across the inlet 302 and outlet 304 of at least 5 psi. Thus, when the fluid pressure at the inlet is greater than the fluid pressure at the outlet, the valve permits fluid flow from the inlet through the first valve port opening and first tapered arcuate slot into the valve chamber, and out through the second tapered arcuate slot and second valve port opening to the outlet. The flow rate of fluid through the valve 300 is controlled by the rotational position of the first and second tapered arcuate slots 322 and 324 relative to the first and second valve port openings 312 and 314 respectively. The valve 300 may further comprise a bleed passage 380 extending between the valve chamber 310 and the converging-diverging passageway 362/364 of the two-way check valve 360, wherein fluid is passed through the bleed passage 380 and two way check valve 360 to the low pressure side. This bleed passage allows for reducing the effect of forward and reverse flow hysteresis caused by changes in pressure levels.

Figure 4:
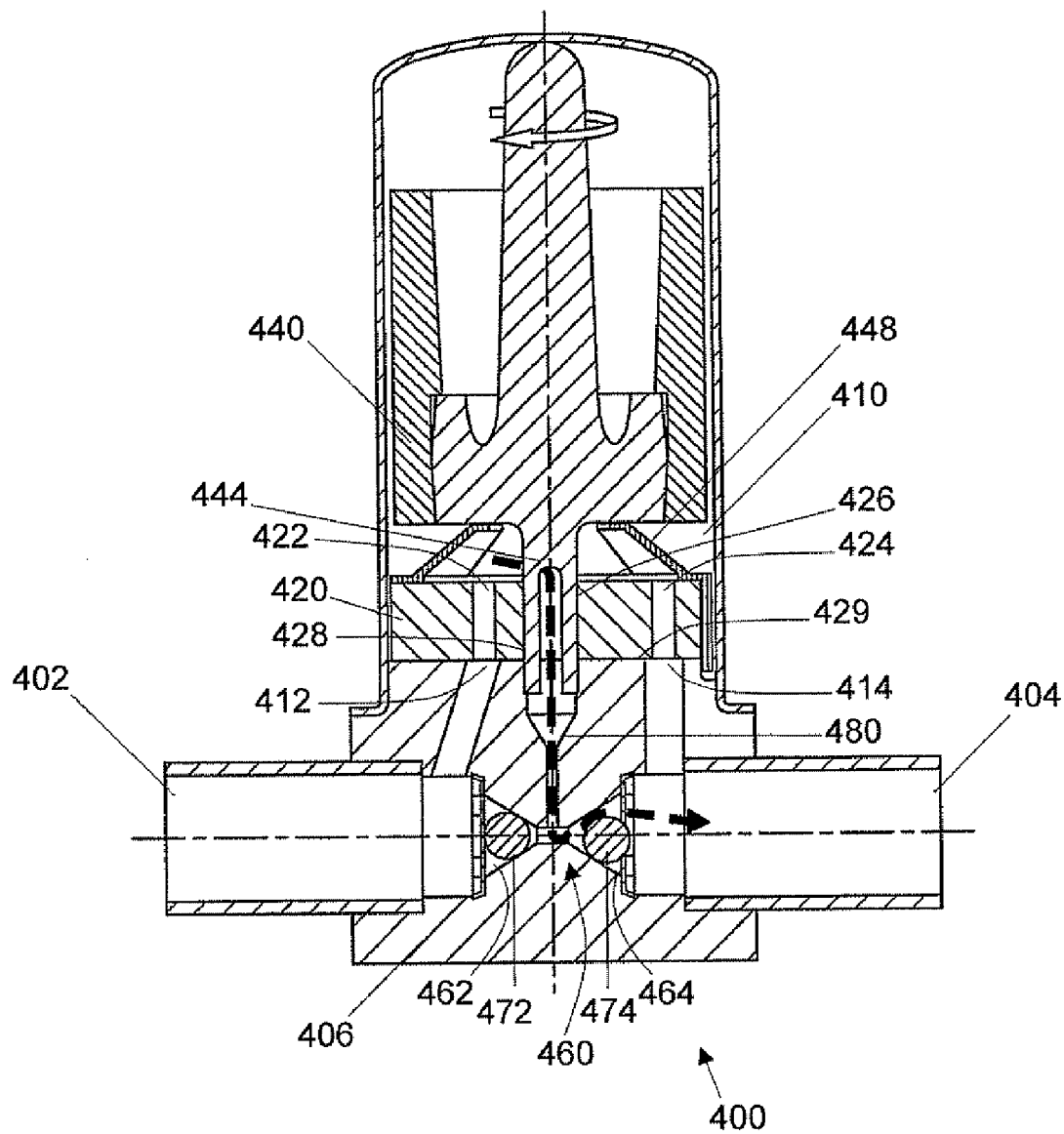
FIG. 4 is a cross-sectional view of a fourth embodiment of a solenoid valve shown in an open position.

Referring to FIG. 4, a fourth embodiment of a flow control valve is shown generally at 400. The flow control valve 400 comprises a valve housing 406 having an inlet 402 and an outlet 404. The valve 400 further includes a valve chamber 410. The valve chamber 410 has a first valve port opening 412 in communication with the inlet 402, and a second valve port opening 414 in communication with the outlet 404. A modulating member 420 is disposed in the chamber 410 approximate the first valve port opening 412 and second valve port opening 414. The modulating member 420 preferably has a first tapered arcuate slot 422 and second tapered arcuate slot 424 encircling a central aperture 426. The modulating member 420 is configured, by virtue of a keyed configuration of the central aperture 426, to rotate about the central aperture 426 to position a portion of the first tapered arcuate slot 422 over the first valve port opening 412, and to position a portion of the second tapered arcuate slot 424 over the second valve port opening 414. Rotation of the modulating member 420 adjustably positions a wider or narrower portion of both the first tapered arcuate slot 422 and second tapered arcuate slot 424 over the first valve port opening 412 and second valve port opening 414 respectively, to adjustably vary the rate of fluid flow through the valve 400. The flow control valve further includes a motor 440 coupled to the modulating member 420 via the central aperture 426, for adjustably rotating the modulating member 420 to controllably adjust the rate of fluid flow through the valve port openings to the outlet 404.

The modulating member 420 in the fourth embodiment preferably comprises a plate having a generally round contour or periphery, and a central aperture 426 having a keyed configuration or surface 428 with which the modulating member may be rotated by a drive shaft component. The modulating member 420 further comprises a first inner arcuate slot 422 that is comet-shaped or semi-circular in contour, and generally partially encircles or surrounds the central aperture 426 in a concentric manner. The modulating member 420 further comprises a second outer arcuate slot 424 that is also comet-shaped or semi-circular in contour, and generally partially encircles or surrounds the central aperture 426 in a concentric manner, (as shown in FIG. 9, for example). The first and second semi-circular slots 422, 424 are generally disposed on generally opposing sides of the modulating member 420, to correspond with the first and second valve port openings 412 and 414 that are also on generally opposed sides of the valve chamber 410. It should be noted that the first inner arcuate slot 422 and second outer arcuate slot 424 may be positioned on the same side of the modulating member 420, where the first and second valve port openings 412, 414 are on the same side of the valve chamber 410. Likewise, the modulating member 420 may have a first inner arcuate slot 422 and second outer arcuate slot 424 in any arrangement that corresponds to the orientation of the first and second valve port openings 412, 414 within the valve chamber 410.

The first and second semi-circular slots 422, 424 are generally aligned or positioned to correspond with the first and second valve port openings 412 and 414, such that rotation of the modulating member 420 adjustably positions a wider or narrower portion of both the first tapered arcuate slot 422 and second tapered arcuate slot 424 over the first valve port opening 412 and second valve port opening 414 respectively, to adjustably vary the rate of fluid flow through the valve 400. The modulating member is further configured to be rotated to a substantially closed position, in which the first and second valve port openings 412, 414 are substantially closed off by the surface 429 of the modulating member 420, to restrict fluid flow through the valve port openings 412, 414.

The fourth embodiment of a flow control valve 400 further includes a stepper motor, or indexing motor, which includes a drive shaft 444 that is configured to be coupled to the central aperture 426 of the modulating member 420. The stepper motor 440 is capable of adjustably rotating the modulating member 420, to controllably adjust the rate of fluid flow through the valve port openings 412, 414 to the outlet 404. The motor 440 controllably rotates the modulating member 420 to incrementally index the modulating member 420 to a plurality of positions for incrementally adjusting the rate of fluid flow through the valve port openings 412, 414.

The fourth embodiment of a flow control valve 400 further includes a biasing spring 448, which is configured to bias the modulating member against the first and second valve port openings 412 and 414. The biasing spring 448 is preferably configured to hold or maintain the position of the modulating member 420 adjacent to or approximate the valve port openings 412 and 414, to provide for effectively sealing against the openings at fluid operating pressures up to 500 psi.

In the fourth embodiment of a flow control valve, the valve further comprises an integral two-way check valve 460 disposed between the inlet 402 and outlet 404, as shown in FIG. 4. The two-way check valve 460 may comprise a converging-diverging passageway 462 and 464, each end portion of which has a check ball 472 and 474 retained therein. Each check ball 472 and 474 is configured to move into engagement with the tapered passageway to block the passageway and restrict fluid flow through the passageway when exposed to a pressure differential across the inlet 402 and outlet 404 of at least 5 psi. Thus, when the fluid pressure at the inlet is greater than the fluid pressure at the outlet, the valve permits fluid flow from the inlet through the first valve port opening and first tapered arcuate slot into the valve chamber, and out through the second tapered arcuate slot and second valve port opening to the outlet. The flow rate of fluid through the valve 400 is controlled by the rotational position of the first and second tapered arcuate slots 422 and 424 relative to the first and second valve port openings 412 and 414 respectively. The valve 400 may further comprise a bleed passage 480 extending between the valve chamber 410 and the converging-diverging passageway 462/464 of the two-way check valve 460, wherein fluid is passed through the bleed passage 480 and two way check valve 460 to the low pressure side. This bleed passage allows for reducing the effect of forward and reverse flow hysteresis caused by changes in pressure levels. It should be noted that the flow control valve 400 is adapted for forward or reverse flow directions, and that the designation of an inlet 402 and outlet 404 should not be interpreted to limit flow direction only that of inlet 402 to outlet 404. Accordingly, the outlet 404 of the flow control valve may also be an inlet and the inlet 402 may also be an outlet, where the direction of flow through the valve is reversed.

Figure 5:
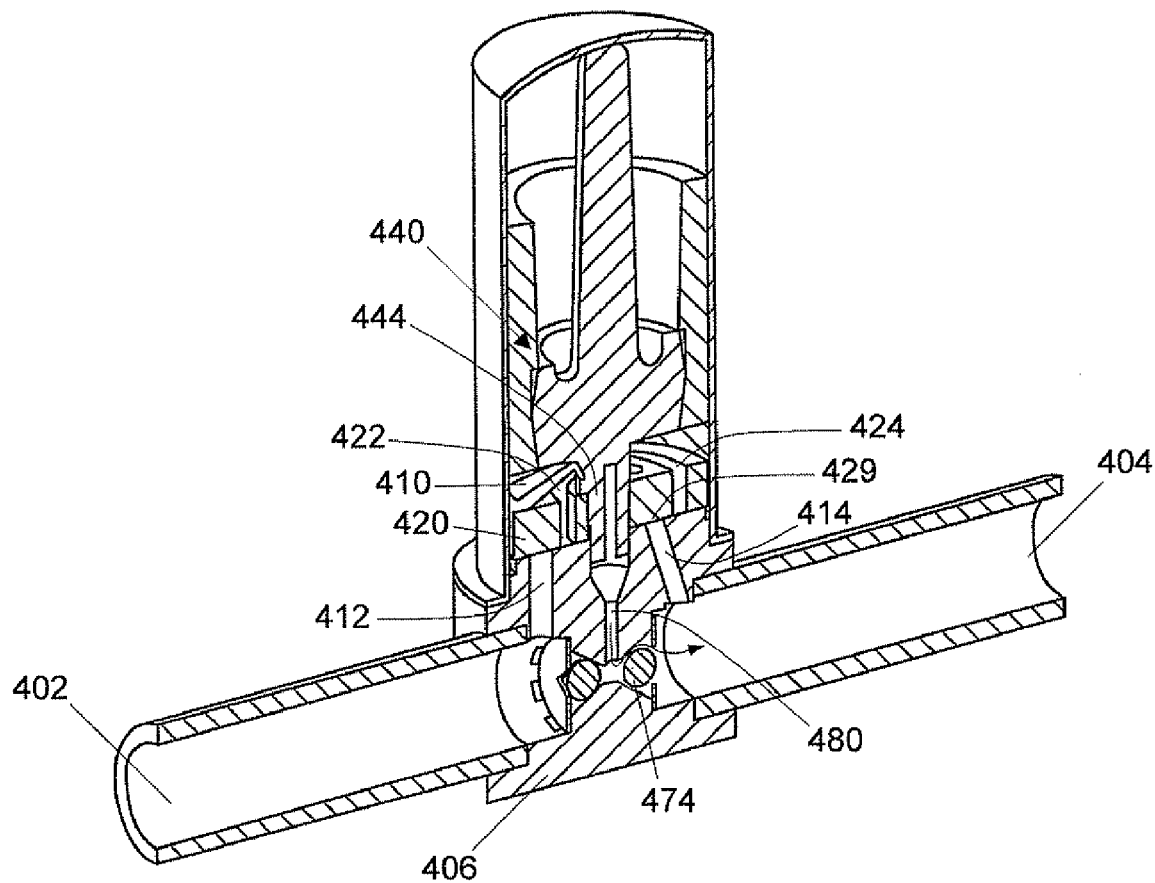
FIG. 5 is a perspective cross-sectional view of a motor, spring biased modulating component and valve housing assembly as shown in FIGS. 2 and 4.

This bleed passage feature is further illustrated in FIG. 5, and explained as follows. Where the high pressure side is at the inlet 402, fluid entering at 402 flows through valve port 412 and through a portion of arcuate slot 422 into the valve chamber 410 to the space above the modulating plate 420. As the plate 420 is rotated to a closed position as shown in FIG. 5, the arcuate slot 422 is rotated away from a position overlying the second valve port 414. Thus, high fluid pressure at the inlet 402 and in the valve chamber 410 does not result in fluid flow through valve port 414. However, some trace amount of fluid flows from the valve chamber 410 through the passage 480 and past the check valve ball 474 to the outlet, as shown by the arrow. Accordingly, the bleed passage 480 accommodates or affects changes in pressure when the flow path in a particular direction is closed, as in the situation where flow is changed to the opposite direction.

Figure 6:
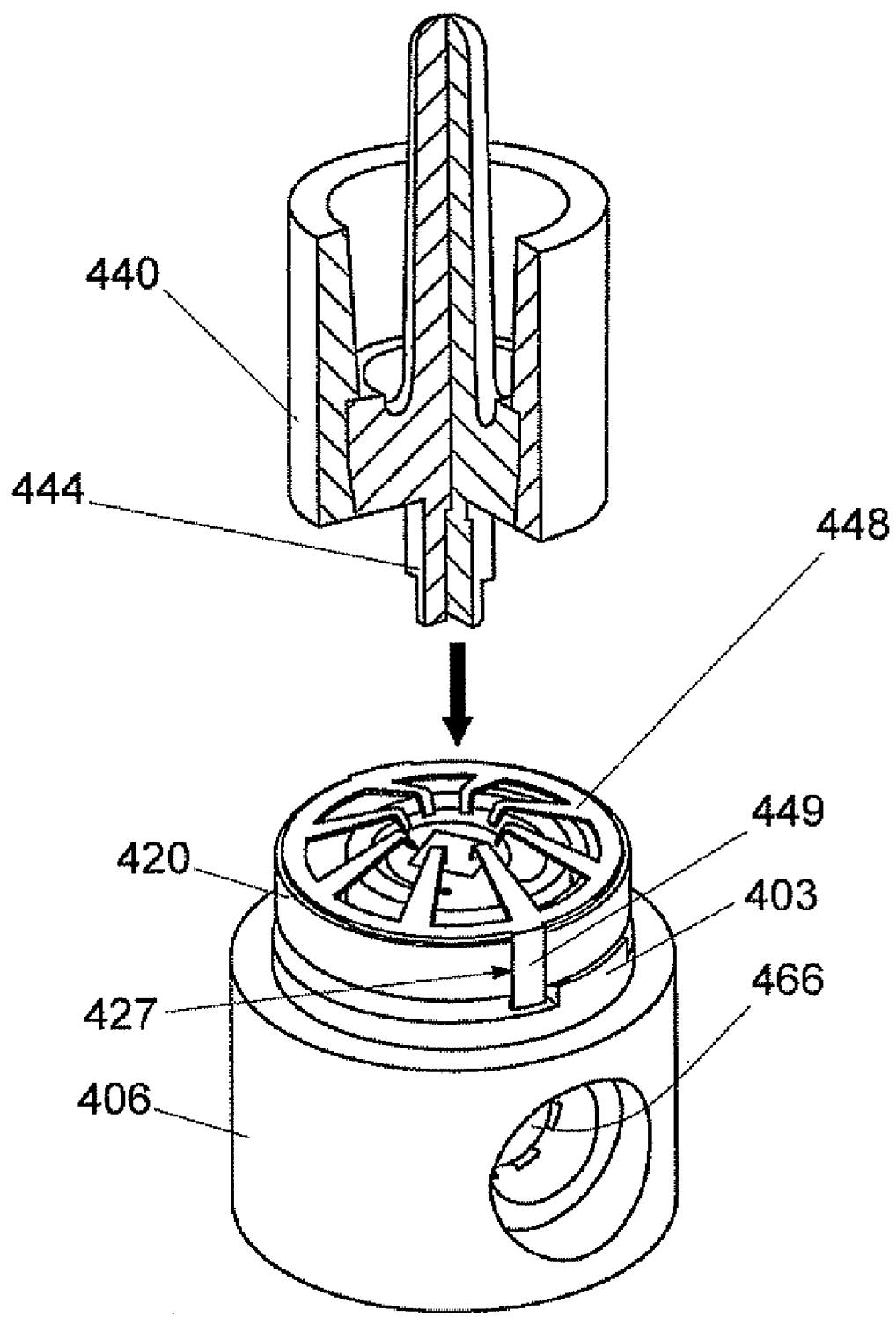
FIG. 6 is an exploded view of a motor, and a spring biased modulating component-valve housing assembly as shown in FIGS. 2 and 4.
Figure 8:
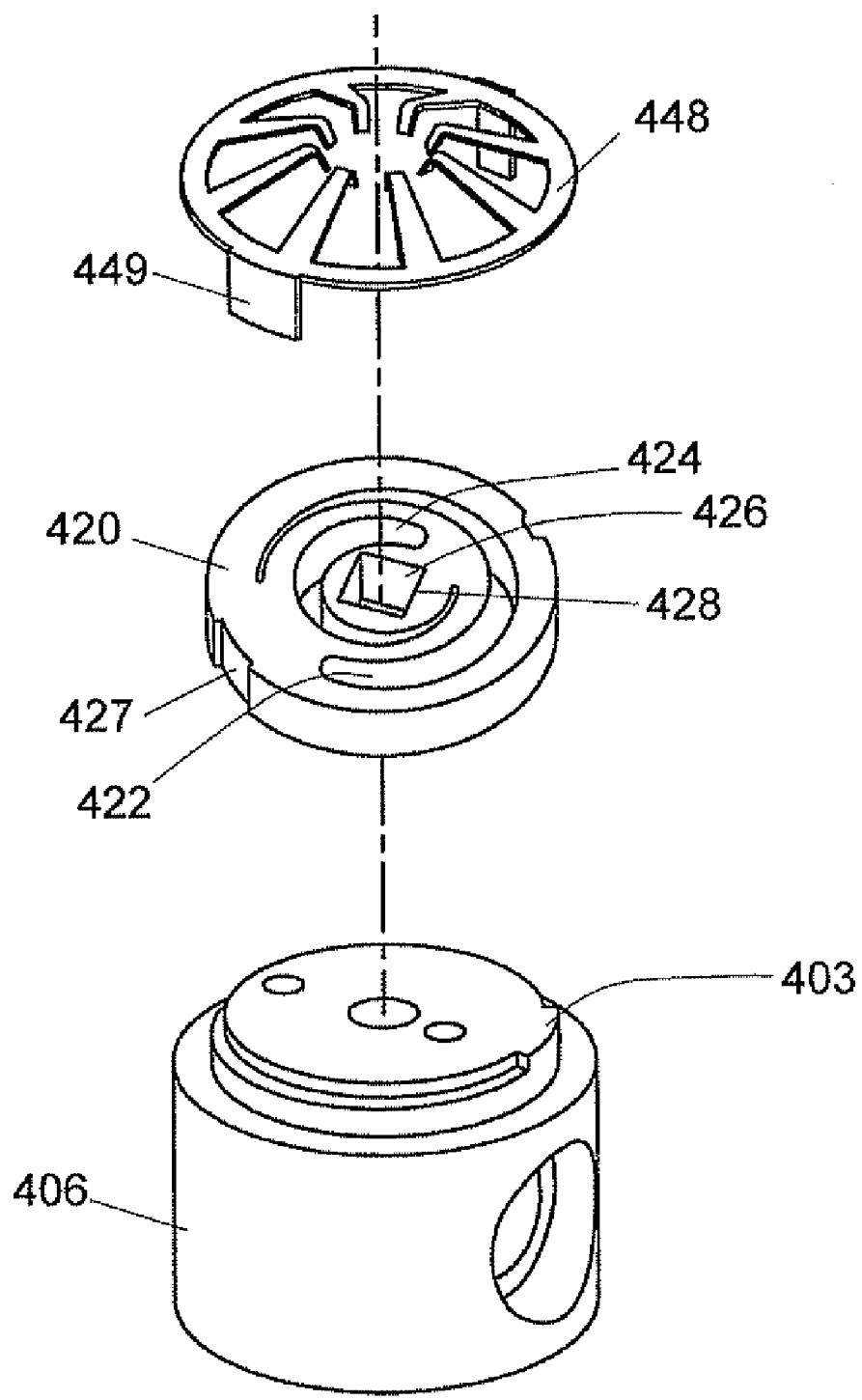
FIG. 8 is perspective view of a spring, modulating component and valve housing assembly as shown in FIGS. 2 and 4.

Referring to FIG. 6, the motor's rotor and motor drive shaft 444, and the biasing spring 448 and modulating member 420 are shown assembled to the valve housing 406. As shown in FIGS. 6 and 8, the biasing spring 448 includes a tab 449 that is seated in a slot 427 in the modulating member 420, such that the spring 448 and the modulating member 420 rotate together within the valve housing 406. The tab 449 extends below the modulating member 420, and is configured to engage a stop 403 on the valve housing 406. The spring's tab 449, together with the modulating member slot, provide for limiting the rotation of the modulating member relative to the valve housing's stop, such that the modulating member does not rotate a full 360 degrees.

Figure 7:
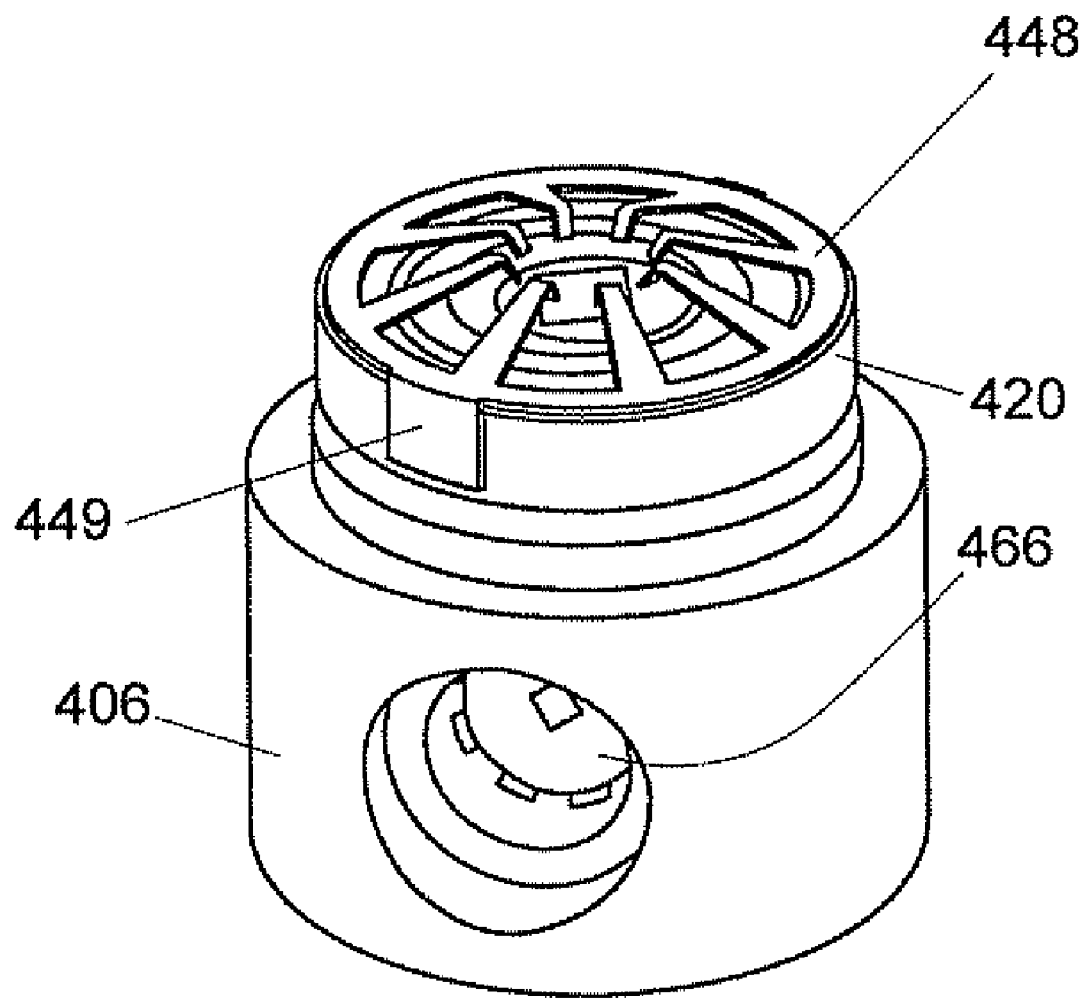
FIG. 7 is a n exploded view of a spring, modulating component and valve housing assembly as shown in FIGS. 2 and 4.

Referring to FIG. 7, the check valve 460 further comprises a retaining plate within each end of the diverging converging passage, behind which the check ball 472, 474 is retained. The retaining plate 466 shown in FIG. 7 includes on opening therein through which fluid may flow through the check valve 460.

Referring to FIGS. 8 and 9, the modulating member 420 is shown in more detail relative to the first and second valve port openings 412 and 414. FIG. 9 shows the cross-sectional area of the portion of the first and second arcuate slots that overly the first and second valve port openings 422 and 424, which area is shown in cross-hatch. As shown in FIG. 9, the arcuate slots 422 and 424 provide for adjustably changing the effective area through which fluid may flow between the first valve port 412 and the second valve port 414, by rotation of the modulating member 420. The modulating member 420 comprises a plate having a generally round contour, a central aperture 426 having a keyed configuration, a first inner semi-circular slot 422 concentric with the approximate center of the central aperture 426, and a second outer semi-circular slot 424 concentric with the approximate center of the central aperture 428. The first and second semi-circular slots 422 and 424 both taper in width towards the same radial direction. The first and second semi-circular slots 422 and 424 are disposed on generally opposing sides of the modulating member, but may alternatively be positioned in any radial position relative to each other.

Figure 10:
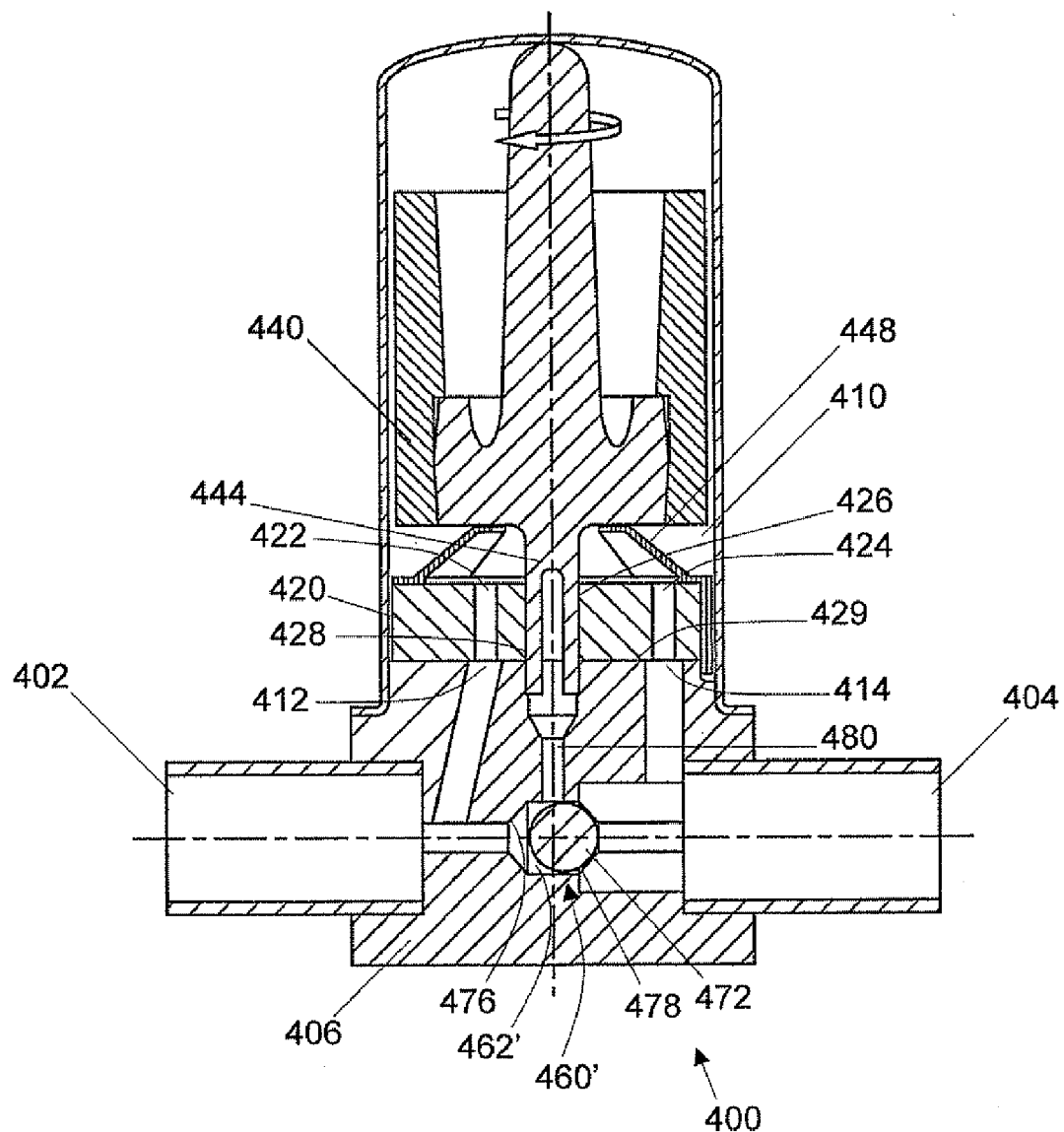
FIG. 10 is a cross-sectional view of an embodiment of a solenoid valve having an alternate construction of a check valve according to the principles of the present invention.

Referring to FIG. 10, an alternate construction of the two-way check valve 460 is shown. The check valve 460' comprises a single check ball 472 disposed within a check valve chamber 462, said check ball being configured to seal off either of a pair of opposed openings 476 and 478 in the check valve chamber 462 that are in communication with the inlet 402 and the outlet 404.

Figure 11:
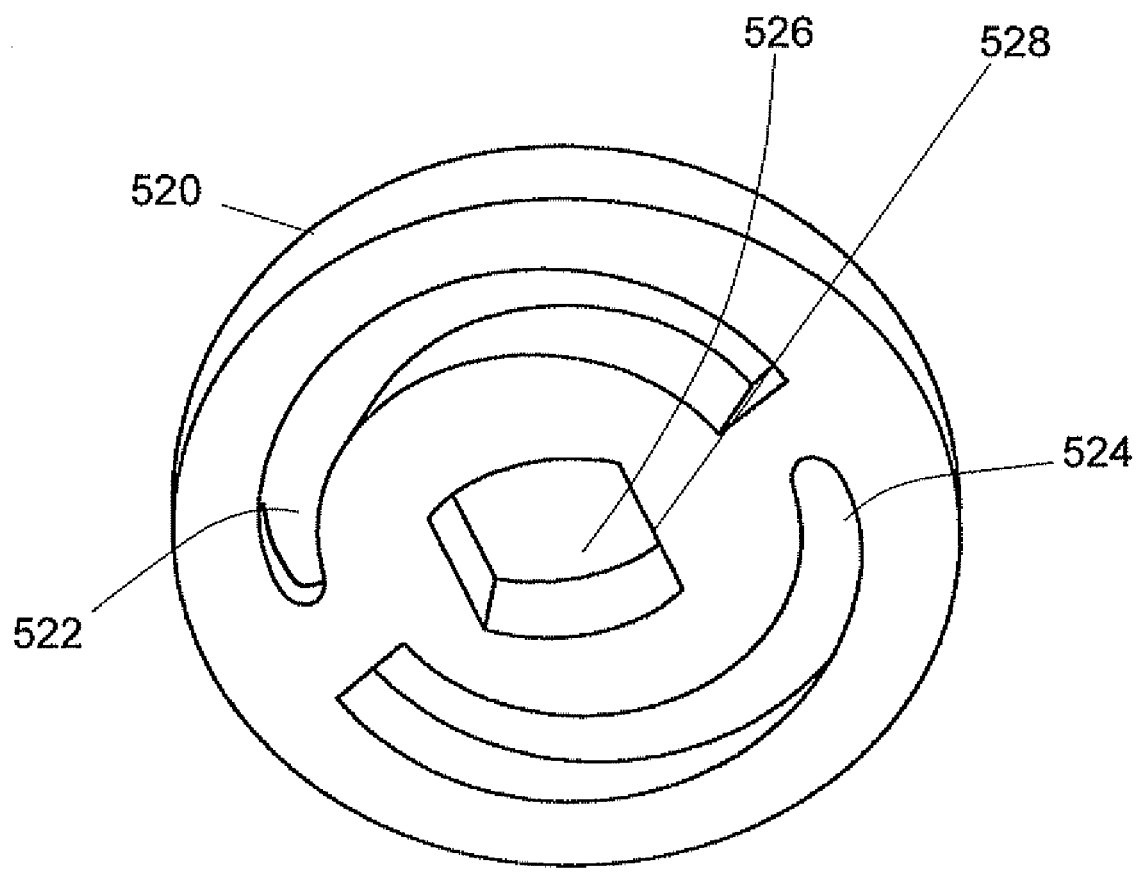

Referring to FIG. 11, an alternate construction of a modulating member 520 is shown. The cross-sectional area of the portion of the first and second arcuate slots 522 and 524 that each respectably over-lie the valve's first and second valve port openings, which is shown in cross hatch. The modulating member 520 comprises a plate having a generally round contour, a central aperture 526 having a keyed configuration, a first semi-circular slot 522 concentric with the approximate center of the central aperture 526, and a second semi-circular slot 524 concentric with the approximate center of the central aperture 526. The first and second semi-circular slots 522 and 524 both taper in width towards the same radial direction. The first and second semi-circular slots 522 and 524 are disposed on generally opposing sides of the modulating member, but may alternatively be positioned in any radial position relative to each other. In this construction, the first and second arcuate slots 522, 524 are shorter in length than slots 422 and 424 shown in FIG. 9. The first and second arcuate slots 522, 524 also lie along the same diameter encircling the central aperture 526. The arcuate slots 522 and 524 provide for adjustably changing the effective area through which fluid may flow between the first valve port and the second valve port, by rotation of the modulating member 520. In this construction, the modulating member 520 rotates only 180 degrees, in which rotation range each slot 522, 524 moves relative to its respective valve port opening. Thus, this construction of a modulating member 520 does not provide as much rotational range for adjustment of flow as the modulating member 420 shown in FIG. 9.

Figure 12:
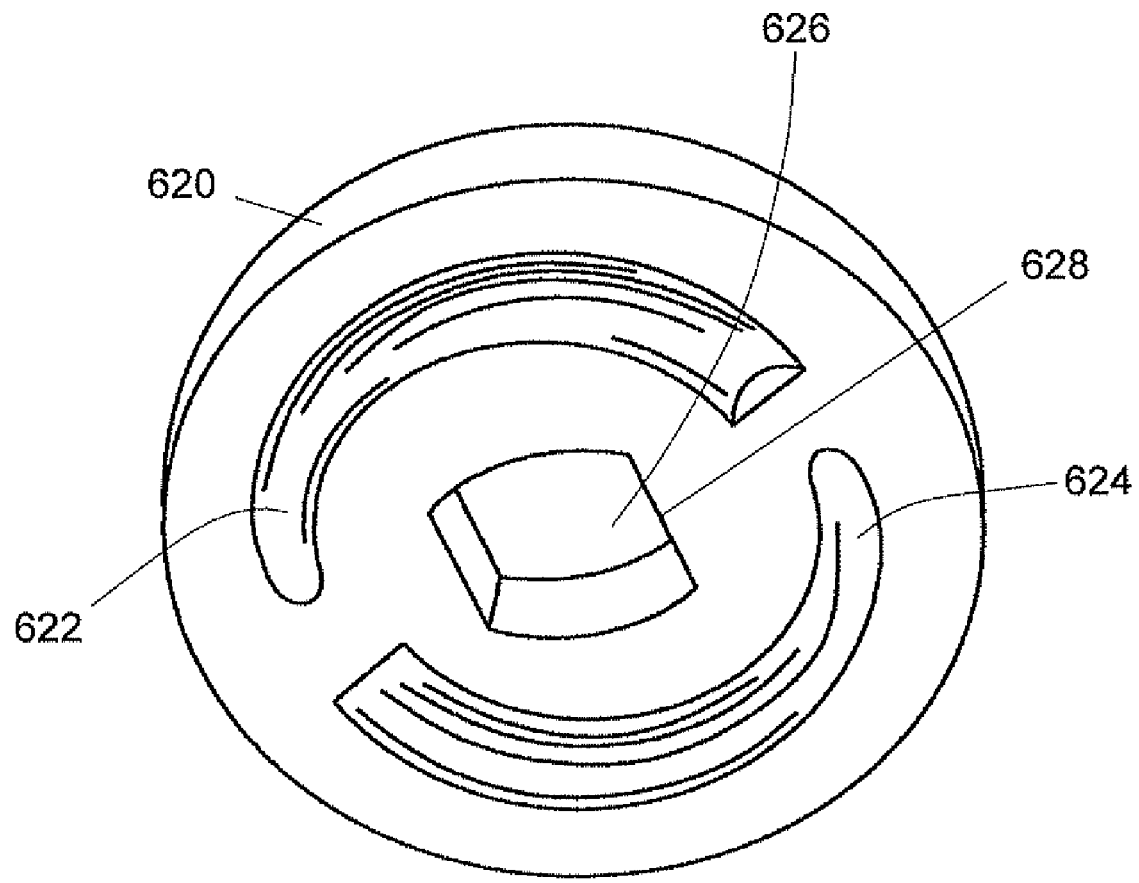

Referring to FIG. 12, another alternate construction of a modulating member 620 is shown. The cross-sectional area of the portion of the first and second arcuate grooves 622 and 624 that each respectably over-lie the valve's first and second valve port openings, where the grooves 622 and 624 do not extend through the modulating member 620. In this construction, fluid flows out the valve ports and through the grooves 622 and 624. The modulating member 620 comprises a plate having a generally round contour, a central aperture 626 having a keyed configuration, a first semi-circular groove 622 concentric with the approximate center of the central aperture 626, and a second semi-circular groove 624 concentric with the approximate center of the central aperture 626. The first and second semi-circular grooves 622 and 624 both taper in width towards the same radial direction. The first and second semi-circular grooves 622 and 624 are disposed on generally opposing sides of the modulating member, but may alternatively be positioned in any radial position relative to each other. In this construction, the first and second arcuate grooves 622, 624 are shorter in length than slots 422 and 424 shown in FIG. 9. The first and second arcuate grooves 622, 624 also lie along the same diameter encircling the central aperture 626. The arcuate grooves 622 and 624 provide for adjustably changing the effective area through which fluid may flow between the first valve port and the second valve port, by rotation of the modulating member 620. In this construction, the modulating member 620 rotates only 180 degrees, in which rotation range each groove 622, 624 moves relative to its respective valve port opening. Thus, this construction of a modulating member 620 does not provide as much rotational range for adjustment of flow as the modulating member 420 shown in FIG. 9.

Figure 13:
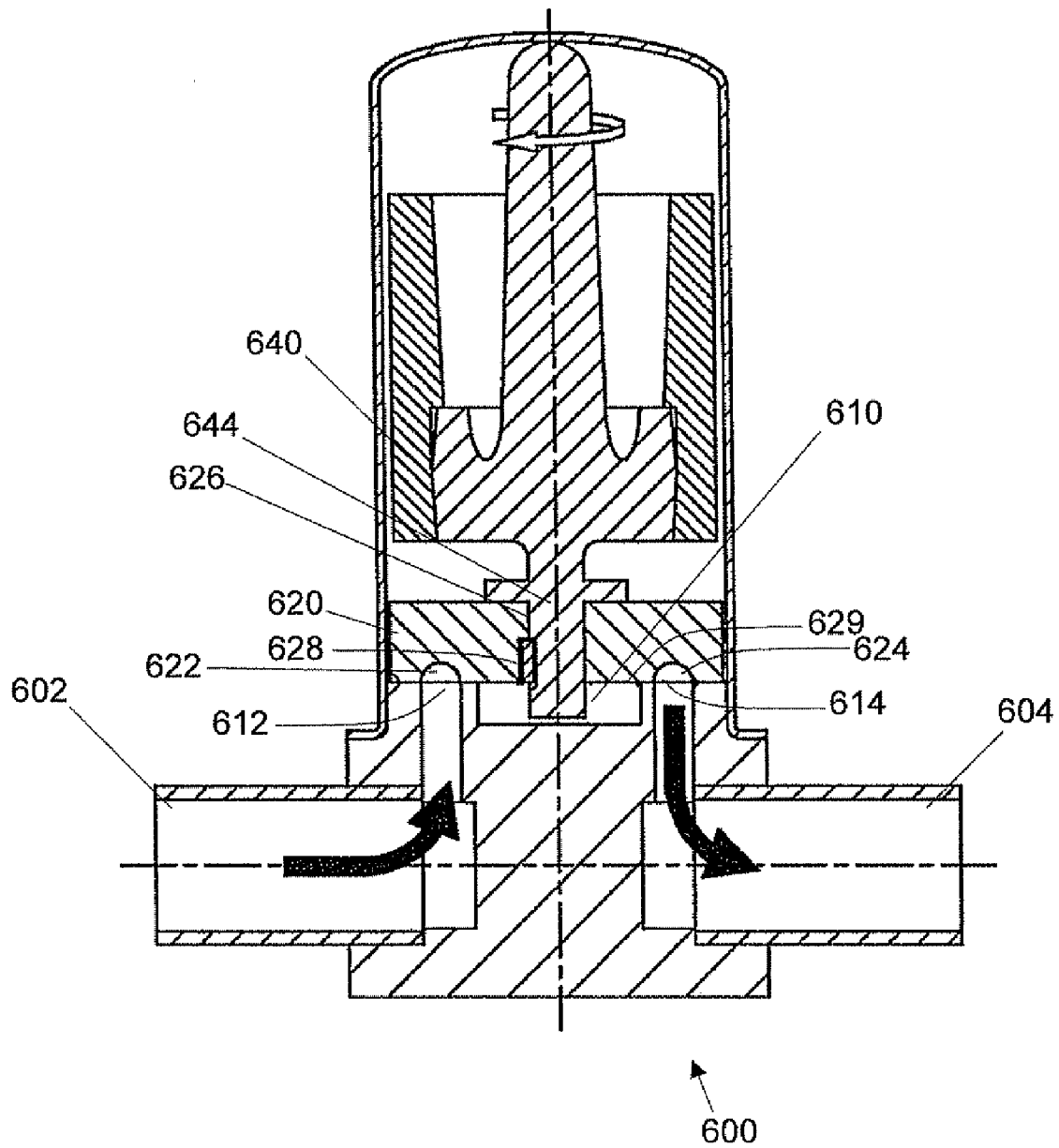

Referring to FIG. 13, an exemplary embodiment of a flow control valve having the modulating member 620 of FIG. 12 is shown. The flow control valve 600 comprises a valve housing 606 having an inlet 602 and an outlet 604. The valve 600 further includes a valve chamber 610. The valve chamber 610 has a first valve port opening 612 in communication with the inlet 602, and a second valve port opening 614 in communication with the outlet 604. The valve port openings 612 and 614 are generally provided on a raised surface. A modulating member 620 is disposed in the chamber 610 approximate the first valve port opening 612 and second valve port opening 614. The modulating member 620 preferably has a first tapered arcuate groove 622 and second tapered arcuate groove 624. The modulating member 620 is configured, by virtue of a keyed configuration of a central aperture 626, to rotate about the central aperture 626 for positioning a portion of the first tapered arcuate groove 622 over the first valve port opening 612, and to position a portion of the second tapered arcuate groove 624 over the second valve port opening 614. Fluid is then permitted to flow from one valve port opening through the arcuate groove into the valve chamber 610, and through the other arcuate groove and out the other valve port opening. Rotation of the modulating member 620 adjustably positions a wider or narrower portion of both the first tapered arcuate groove 622 and second tapered arcuate groove 624 over the first valve port opening 612 and second valve port opening 614 respectively, to adjustably vary the rate of fluid flow through the valve 600. The flow control valve further includes a motor 640 coupled to the modulating member 620 via the central aperture 626, for adjustably rotating the modulating member 620 to controllably adjust the rate of fluid flow through the valve port openings to the outlet 604.

It should be noted that any of the preceding exemplary embodiments, various features may be combined, substituted or omitted. Alternative constructions of one or more of the above exemplary embodiments may include various combinations of the above disclosed features. For example, various alternate embodiments may include or omit either of the disclosed check valve designs, and bleed valve passage, and may further include or omit the biasing spring. Additionally, the above exemplary embodiments may comprise various alternate constructions of the modulating member, in which various designs of a slot or groove having varying cross-sectional width may be employed to gradually change the effective opening area through which fluid may flow through the valve.

Accordingly, the description of the various embodiments above is merely exemplary in nature and, thus, variations that do not depart from the gist of the invention are intended to be within the scope of the invention. Additional design considerations, such as the control of the application of voltage to the stepper motor, may be incorporated without departing from the spirit and scope of the invention. Such variations are not to be regarded as a departure from the spirit and scope of the invention. Accordingly, it is not intended that the invention be limited by the particular embodiment or form described above, but by the appended claims.

What is claimed is:

1. A valve comprising:
    a valve housing having an inlet, an outlet, and a valve chamber therein, the valve chamber having a first valve port opening in communication with the inlet and a second valve port opening in communication with the outlet;
    a modulating member disposed in the valve chamber approximate the first valve port opening and second valve port opening, the modulating member having a central aperture, and a first tapered arcuate slot extending completely through the modulating member and second tapered arcuate slot extending completely through the modulating member, the first and a second tapered arcuate slots encircling the central aperture, where the modulating member is configured to be rotated about the central aperture for positioning a portion of the first tapered arcuate slot over the first valve port opening and a portion of the second tapered arcuate slot over the second valve port opening, wherein rotation of the modulating member adjustably positions a wider or narrower portion of both the first tapered arcuate slot and second tapered arcuate slot over the first valve port opening and second valve port opening respectively, to adjustably vary the rate of fluid flow through the first valve port opening and second valve port opening, such that fluid flows from the inlet through the first valve port opening and first tapered arcuate slot extending completely through the modulating member into a portion of the valve chamber that is above the modulating member, and out through the second tapered arcuate slot extending completely through the modulating member and second valve pod opening to the outlet; and
    a biasing spring for biasing the modulating member against the first valve port opening and the second valve pod opening, where the spring is coupled to the modulating member such that the spring and the modulating member rotate together.

2. A valve comprising:
    a valve housing having an inlet, an outlet, and a valve chamber therein, the valve chamber having a first valve port opening in communication with the inlet and a second valve port opening in communication with the outlet;
    a modulating member disposed in the chamber approximate the first valve port opening and second valve port opening, the modulating member having a central aperture, and a first tapered arcuate slot and second tapered arcuate slot encircling the central aperture, where the modulating member is capable of being rotated about the central aperture for positioning a portion of the first tapered arcuate slot over the first valve port opening and a portion of the second tapered arcuate slot over the second valve port opening, wherein rotation of the modulating member adjustably positions a wider or narrower portion of both the first tapered arcuate slot and second tapered arcuate slot over the first valve port opening and second valve port opening respectively, to adjustably vary the rate of fluid flow through the first valve port opening and second valve port opening, wherein when fluid pressure at the inlet is greater than the fluid pressure at the outlet, the valve permits fluid flow from the inlet through the first valve port opening and first tapered arcuate slot into the valve chamber, and out through the second tapered arcuate slot and second valve port opening to the outlet, the flow rate of which is controlled by the rotational position of the first and second tapered arcuate slots relative to the first and second valve port openings respectively; and
    a two-way check valve comprising a converging-diverging passageway having first and second end portions, each end portion of which has a check ball retained therein, each check ball being configured to block the converging-diverging passageway to restrict fluid flow through the converging-diverging passageway when exposed to a pressure differential across the inlet and outlet of at least 5 psi.

3. The valve of claim 2 further comprising a bleed passage disposed between the valve chamber and the converging-diverging passageway of the two-way check valve, wherein fluid is passed through the bleed passage and two-way check valve to a low pressure side of the two-way check valve to reduce the effect of forward and reverse flow hysteresis caused by changes in pressure levels.

4. A valve comprising:
    a valve housing having an inlet, an outlet, and a valve chamber therein, the valve chamber having a first valve port opening in communication with the inlet and a second valve port opening in communication with the outlet;
    a modulating member disposed in the chamber approximate the first valve port opening and second valve port opening, the modulating member having a central aperture, and a first tapered arcuate slot and a second tapered arcuate slot encircling the central aperture, the modulating member being configured to rotate about the central aperture for positioning a portion of the first tapered arcuate slot over the first valve port opening and a portion of the second tapered arcuate slot over the second valve port opening, where rotation of the modulating member adjustably positions a wider or narrower portion of both the first tapered arcuate slot and second tapered arcuate slot over the first valve port opening and second valve port opening respectively, to adjustably vary the flow rate through the first valve port opening and second valve port opening;
    a two-way check valve disposed between the inlet and the outlet of the valve housing, the two-way check valve including a converging-diverging passageway, each end portion of which has a check ball retained therein; and
    a motor having a shaft coupled to the modulating member's central aperture for adjustably rotating the modulating member to controllably adjust the rate of fluid flow through the first and second valve pod openings.

5. The valve of claim 4 further comprising a bleed passage extending between the valve chamber and the converging-diverging passageway of the two-way check valve chamber, wherein fluid is passed through the bleed passage and two way check valve to the low pressure side to reduce the effect of forward and reverse flow hysteresis caused by changes in pressure levels.

6. The valve of claim 4 wherein each check ball is configured to block off the passageway to restrict fluid flow through the passageway when the valve is exposed to a pressure differential across the inlet and outlet of at least 5 psi.

7. The valve of claim 4 further comprising a biasing spring for biasing the modulating member against the first valve port opening and the second valve port opening.

8. The valve of claim 4 wherein the modulating member is configured to be rotated to a closed position in which the first and second valve port openings are substantially closed off to restrict fluid flow therethrough.

9. The valve of claim 4 wherein the motor controllably rotates the modulating member to incrementally index the modulating member to a plurality of positions for incrementally adjusting the rate of fluid flow through the valve port openings.

10. The valve of claim 4 wherein the modulating member comprises a plate having a generally round contour, a central aperture having a keyed configuration, a first inner semi-circular slot concentric with the central aperture, and a second outer semi-circular slot concentric with the central aperture, the first and second semi-circular slots being disposed on generally opposing sides of the modulating member.

* * * * *